United States Patent [19]

Canivenc et al.

[11] Patent Number: 5,283,296
[45] Date of Patent: Feb. 1, 1994

[54] MODIFIED POLYMERS BASED ON GRAFT POLYESTER AND THEIR PREPARATION PROCESS

[75] Inventors: Edith Canivenc, Lyons; Jean-Francois Fiard, Paris; Etienne Fleury, Lyons, all of France

[73] Assignee: Rhone-Poulenc Chimie, Courbevoie, France

[21] Appl. No.: 601,812

[22] PCT Filed: Mar. 2, 1990

[86] PCT No.: PCT/FR90/00145
§ 371 Date: Dec. 27, 1990
§ 102(e) Date: Dec. 27, 1990

[87] PCT Pub. No.: WO90/10665
PCT Pub. Date: Sep. 20, 1990

[30] Foreign Application Priority Data

Mar. 8, 1989 [FR] France .................. 89 03268

[51] Int. Cl.$^5$ ............................................. C08F 283/02
[52] U.S. Cl. ........................................ 525/445; 525/446
[58] Field of Search ................... 525/29, 445, 446; 524/539; 523/501

[56] References Cited

U.S. PATENT DOCUMENTS

| 3,075,941 | 1/1963 | Wynstra | 525/29 |
| 4,119,680 | 10/1978 | Vachon | 525/39 |

FOREIGN PATENT DOCUMENTS

| 56-122828 | 9/1981 | Japan | 523/501 |
| 61-201079 | 9/1986 | Japan. | |

Primary Examiner—Ralph H. Dean
Attorney, Agent, or Firm—Burns, Doane, Swecker & Mathis

[57] ABSTRACT

Modified polymers based on a graft polyester comprising:
a backbone derived from a water-dispersible sulphonated polyester
and grafts consisting of copolymer units derived from at least one vinyl monomer and at least one ethylenically unsaturated organopolysiloxane soluble in the said vinyl monomer or monomers.

They are prepared by:
preemulsion, in water, of a solution of an organopolysiloxane in one or more vinyl monomers
followed by addition of the emulsion obtained to an aqueous solution of a water-dispersible sulphonated polyester and polymerization in the presence of a water-soluble or water-dispersible initiator.

They can be used as coating agents.

14 Claims, No Drawings

MODIFIED POLYMERS BASED ON GRAFT POLYESTER AND THEIR PREPARATION PROCESS

The present invention relates to modified polymers based on water-dispersible sulphonated polyester grafted with copolymer units derived from vinyl monomers and an ethylenically unsaturated organopolysiloxane, the process for the preparation of the said modified polymers and their use in the preparation of anti-adhesive coatings.

According to the invention, the modified polymers are based on a graft polyester comprising:

a backbone derived from a water-dispersible sulphonated polyester and grafts consisting of copolymer units derived from at least one vinyl monomer and at least one ethylenically unsaturated organopolysiloxane soluble in the said vinyl monomer or monomers.

The water-dispersible sulphonated polyesters which can make up the backbone are known products. They can be prepared by a co-condensation reaction of an organic diacid (such as a saturated or unsaturated aliphatic diacid, an aromatic diacid, a diacid containing several aromatic rings or an arylaliphatic diacid), one of its diesters or its anhydride and a sulphonated organic diacid or one of its diesters with a diol, in the presence of a catalyst customary for polyesterification, such as tetraisopropyl orthotitanate.

The following may be mentioned as starting monomers currently used for the preparation of water-dispersible sulphonated polyesters:

as organic diacids: saturated or unsaturated aliphatic diacids, aromatic diacids, such as succinic, adipic, suberic and sebacic acids, maleic, fumaric and itaconic acids, orthophthalic, isophthalic and terephthalic acids, the anhydrides of these acids and their diesters, such as the methyl, ethyl, propyl and butyl diesters. The preferred compounds are adipic acid and orthophthalic, isophthalic and terephthalic acids;

as sulphonated organic diacids: sodium diacidsulphonates or their diesters, such as the dialkylisophthalates and dialkylsulphosuccinates, such as sodium 5-dimethylisophthalate-sulphonate or sodium dimethylsulphosuccinate;

as diols: aliphatic glycols, such as ethylene glycol, diethylene glycol and dipropylene glycol and the higher homologues, butane-1,4-diol, hexane-1,6-diol, neopentyl glycol and cycloalkane glycols, such as cyclohexanediol and dicyclohexanediolpropane. The diols chosen preferentially are ethylene glycol and diethylene glycol.

The preferred water-dispersible sulphonated polyesters are those which have a number-average molecular mass of between 10,000 and 35,000, an acid number of less than 5 mg of KOH/G and a proportion of sulphur of between 0.8 and 2% by weight, preferably between 1.2 and 1.8%.

Amongst the vinyl monomers from which the copolymer units making up the grafts can be derived, the following may be mentioned:

the monoethylenically unsaturated esters of carboxylic acids (vinyl acetate, propionate, butyrate, stearate, benzoate ...)

the saturated esters and amides of monoethylenically unsaturated carboxylic acids ($C_1$-$C_{20}$-alkyl acrylates or methacrylates, such as methyl, heptyl, propyl, heptadecanyl ... acrylates and methacrylates, acrylamide, methacrylamide ...)

the monoethylenically unsaturated nitriles (acrylonitrile, methacrylonitrile ...)

the monoethylenically unsaturated carboxylic acids (acrylic acid, methacrylic acid, itaconic acid, maleic acid ...)

the hydroxyalkyl or aminoalkyl esters of monoethylenically unsaturated carboxylic acids (hydroxyethyl acrylate, hydroxypropyl acrylate ..., 2-aminoethyl methacrylate ...)

the vinyl-aromatic monomers (styrene, vinyltoluene ...)

Small amounts (0 to 5%, preferably 0 to 3%, relative to the vinyl monomer or monomers) of crosslinking monomers (divinylbenzene, diallyl phthalate, ethylene glycol diacrylate, methylene-bismethacrylamide, N-methylolacrylamide ...) can also be present.

The ethylenically unsaturated organopolysiloxanes from which the copolymer units making up the grafts are derived can be represented by the following average formula:

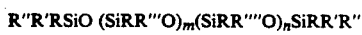

$$R''R'RSiO(SiRR'''O)_m(SiRR''''O)_nSiRR'R''$$

in which formula the symbols R are identical or different and represent a $C_1$-$C_4$-alkyl radical, phenyl or 3,3,3-trifluoropropyl the symbols R' are identical or different and represent R or a vinyl radical the symbols R'' are identical or different and represent R or a radical OH the symbols R''' are identical or different and represent R, a vinyl radical or a —r—X unit in which r represents a divalent organic radical and X represents an ethylenically unsaturated group the symbols R'''' are identical or different and represent R''' or a —r'—X' unit in which r' represents a divalent organic radical and X' represents a functional group which is not ethylenically unsaturated at least 60% of the radicals represented by R, R' and R'' are methyl radicals, and the symbols m and n can separately be zero, R' and/or R'''' representing a vinyl radical if m is zero, and have a value sufficient to ensure a viscosity of the polymer of the order of 20 mpas to 10,000,000 mpas at 25° C., preferably of the order of 50 to 7,000,000 mpas.

The following may be mentioned as examples of diorganosiloxy units in which R''' and R'''' represent R or a vinyl radical: $(CH_3)_2SiO$; $CH_3(CH_2=CH)SiO$; $CH_3(C_2H_5)SiO$; $CH_3(C_6H_5)SiO$; $(C_6H_5)_2SiO$; $CF_3CH_2CH_2(CH_3)SiO$.

Amongst the blocking triorganosiloxy units, those of the following formula may be mentioned: $(CH_3)_3SiO_{0.5}$; $(CH_3)_2CH_2=CHSiO_{0.5}$; $(CH_3)_2C_6H_5SiO_{0.5}$; $CH_3(C_6H_5)_2SiO_{0.5}$; $CH_3(CH_2=CH)C_6H_5SiO_{0.5}$; $CH_2=CH(C_6H_5)SiO_{0.5}$; $(C_6H_5)_3SiO_{0.5}$.

Amongst the divalent organic radicals r and r' which can form part of the structure of the symbols R''' and R'''', the following may be mentioned: straight-chain or branched $C_1$-$C_{18}$-alkylene radicals, optionally extended by 1 to 5 ethylene-amine divalent groups, by 1 to 50 $C_1$-$C_3$-alkylene oxide groups or by a group

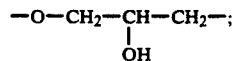

$$-O-CH_2-CH-CH_2-;$$
$$\phantom{-O-CH_2-}|$$
$$\phantom{-O-CH_2-}OH$$

the polyoxyalkylene radicals containing from 1 to 50 $C_1$-$C_3$-oxyalkylene chain members.

The following may be mentioned as examples of divalent radicals:

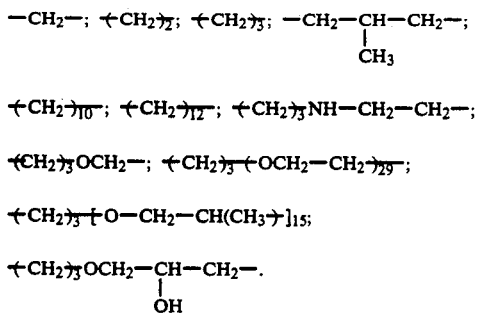

Amongst the ethylenically unsaturated groups X, the acrylyloxy and methacrylyloxy radicals may be mentioned in particular.

Amongst the functional groups X' the epoxy, hydroxyl, carboxyl, aldehyde, ester, acetoester, amino . . . groups may be mentioned.

Amongst the preferred ethylenically unsaturated organopolysiloxanes, those containing acrylate or methacrylate functions may be mentioned, such as those described in the European Patent Application published under No. 281,718 and the U.S. Pat. Nos. 4,293,678; 4,139,548; 4,558,082; 4,663,185; 4,640,967.

The respective amounts of backbone and grafts going into the composition of the modified polymers which are the subject of the invention correspond to:

2 to 60% by weight, preferably 10 to 50% by weight, relative to the modified polymer, of water-dispersible sulphonated polyester 0.05 to 30% by weight, preferably 0.5 to 10% by weight, relative to the modified polymer, of ethylenically unsaturated organopolysiloxane and, making up to 100%, units derived from vinyl monomer(s).

The relative amounts of the various units of the backbone and the grafts are a function of the desired properties of the said modified polymer: glass transition temperature, hardness, hydrophilic character, elongation, resistance to break, anti-adherence.

If products dispersible in water at an alkaline PH are desired, it will be preferable to have units derived from a vinyl monomer composition containing more than 5% of its weight, and generally of the order of 7 to 11% of its weight, of ethylenically unsaturated carboxylic acid and an amount of organopolysiloxane units of less than 30% of the total weight of the modified polymer.

The modified polymers which are the subject of the invention can be prepared by:

preemulsion, in water, of a solution of organopolysiloxane in the vinyl monomer or monomers followed by addition of the emulsion obtained to an aqueous solution of water-dispersible sulphonated polyester and polymerization in the presence of a water-soluble or water-dispersible initiator.

If desired, the particles of the modified polymer obtained are separated from the aqueous medium.

The amounts of reactants used correspond to:

2 to 60% by weight, preferably 10 to 50% by weight, relative to the total weight of monomers and polymers used, of water-dispersible sulphonated polyester 0.05 to 30% by weight, preferably 0.5 to 10% by weight, relative to the total weight of monomers and polymers used, of ethylenically unsaturated organopolysiloxane making up to 100% with vinyl monomer or monomers 0.01 to 4%, preferably 0.05 to 2% by weight, relative to the total weight of monomers and polymers used, of water-soluble or water-dispersible initiator.

The step for preemulsion, in water, of the solution of organopolysiloxane in the vinyl monomer or monomers can be carried out using a weight ratio of vinyl monomer or monomers+organopolysiloxane/water of the order of 1/5 to 5/1, generally of the order of 1/3 to 3/1.

The emulsifying agents which can be used are conventional anionic agents represented, in particular, by the salts of fatty acids, the alkylsulphates, the alkylsulphonates, the alkylarylsulphonates, the sulphosuccinates, the alkylphosphates of alkali metals, the salts of abietic acid, which may be hydrogenated, non-ionic agents, such as the polyethoxylated fatty alcohols, the polyethoxylated alkylphenols, the sulphated polyethoxylated alkylphenols, the polyethoxylated fatty acids.

They can be used in an amount of 0.1 to 3% by weight, relative to the total weight of vinyl monomer or monomers, organopolysiloxane and sulphonated polyester (that is to say of vinyl monomer or monomers and polymers).

One variant of the preemulsion step consists in carrying out this step in the presence of an initiator soluble in organic compounds. Examples which may be mentioned are the organic peroxides, such as lauroyl peroxide, benzoyl peroxide, tert.-butyl peroxide . . . ; the azonitriles, such as azo-bisisobutyronitrile.

Another variant for carrying out the preemulsion step consists in using a fraction of the water-dispersible sulphonated polyester in this step, for example up to 50% by weight of the total weight of water-dispersible sulphonated polyester.

The preemulsion step is beneficially carried out by homogenization.

The polymerization step after addition of the emulsion to an aqueous solution of water-dispersible sulphonated polyester is carried out in the presence of a water-soluble or water-dispersible initiator, such as, for example, hydroperoxides, such as hydrogen peroxide, cumene hydrperoxide, tert.-butyl hydroperoxide or diisopropylbenzene hydroperoxide, and persulphates, such as sodium persulphate, potassium persulphate or ammonium persulphate.

If appropriate, these initiators are combined with a reducing agent, such as sodium bisulphite or sodium formaldehyde sulphoxylate, polyethyleneamines, sugars: dextrose or sucrose, or metal salts. The amounts of reducing agent used vary from 0 to 3% by weight relative to the weight of the monomer(s)+polymers composition.

If appropriate, chain-limiting agents can be present in proportions ranging from 0 to 3% by weight relative to the monomer +polymers composition. They are generally chosen from the mercaptans, such as N-dodecyl mercaptan or tert.-dodecyl mercaptan; cyclohexene; halogenated hydrocarbons, such as chloroform, bromoform, carbon tetrachloride or carbon tetrabromide; and dimers of α-methylstyrene.

If necessary, a supplementary amount of emulsifying agents can be used.

The polymerization operation is carried out at a temperature which is a function of the decomposition temperature of the initiator; this operation generally takes place at a temperature of the order of 60° to 80° C. and preferably of the order of 75° C.

If desired, the latex obtained, which generally contains of the order of 10 to 40% by weight of modified polymer, can be pulverized to be stored and transported more easily.

The modified polymers based on graft polyester have both adherence and anti-adherence properties.

They can be used as coating agents (anti-encrustation, water-resistant paint, oiling agents, lubricants.

The following examples are given by way of illustration and should not be regarded as limiting the scope and the spirit of the invention.

EXAMPLE 1

Preemulsion

The following are mixed in a 1 l beaker:
112 g of methyl methacrylate
44 g of butyl acrylate
and 4 g of methacrylic acid.
The following are added, with stirring:
40 g of an unsaturated organopolysiloxane oil of average formula

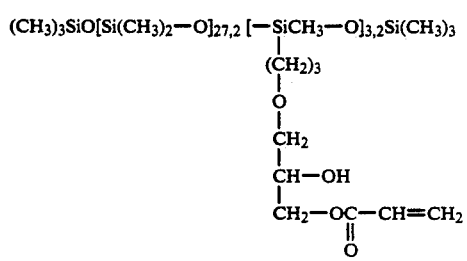

0.2 g of lauroyl peroxide.

The mixture is stirred until all of the components have dissolved.

80 g of water, 2 g of a 40.7% by weight aqueous solution of partially sulphated, ethoxylated nonylphenol containing 25 units of ethylene oxide, 3 g of a 20% by weight aqueous solution of sodium dodecylbenzenesulphonate and 60 mg of ethylenediaminetetraacetic acid (EDTA) are mixed in a beaker.

The acrylic monomers/diorganopolysiloxane mixture is introduced into this solution, with stirring. The mixture obtained is emulsified using an ULTRA-TURAX type homogenizer (marketed by PROLABO) for 5 minutes at 20,000 revolutions/minute.

Polymerization

The following are introduced into a one liter flask:
360 g of water
1 g of 40.7% by weight aqueous solution of partially sulphated, ethoxylated nonylphenol containing 25 units of ethylene oxide
2 g of 20% by weight aqueous solution of sodium dodecylbenzenesulphonate
40 mg of EDTA
152 g of a 26.4% aqueous solution of GEROL PS 20 (water-dispersible sulphonated polyester marketed by RHONE-POULENC), which corresponds to 40 g of dry product.

Once the mixture has been brought to 75° C., with stirring, 0.8 g of ammonium persulphate dissolved in 10 ml of water is added and the preemulsion is then introduced in the course of 3 hours.

The mixture is kept at 75° C. for a further 1 hour after the end of the introduction and is then brought back to ambient temperature.

A latex containing 28% of dry extract is obtained.

EXAMPLE 2

Preemulsion

The following are mixed in a 1 l beaker:
120 g of vinyl acetate
44 g of butyl acrylate
and 20 g of acrylic acid.
The following are added, with stirring:
7 40 g of the silicone oil from Example 1
0.2 g of lauroyl peroxide.

The mixture is stirred until all of the components have dissolved.

80 g of water, 2 g of 40.7% by weight aqueous solution of partially sulphated, ethoxylated nonylphenol containing 25 units of ethylene oxide, 3 g of a 20% by weight aqueous solution of sodium dodecylbenzenesulphonate and 60 mg of ethylenediaminetetraacetic acid (EDTA) are mixed in a beaker.

The acrylic monomers/diorganopolysiloxane mixture is introduced into this solution, with stirring. The mixture obtained is emulsified using an ULTRA-TURAX type homogenizer (marketed by PROLABO) for 5 minutes at 20,000 revolutions/minute.

Polymerization

The following are introduced into a one liter flask:
360 g of water
1 g of 40.7% by weight aqueous solution of partially sulphated, ethoxylated nonylphenol containing 25 units of ethylene oxide
2 g of 20% by weight aqueous solution of sodium dodecylbenzenesulphonate
40 mg of EDTA
50.5 g of a 27.7% aqueous solution of GEROL PS 20 (water-dispersible sulphonated polyester marketed by RHONE-POULENC), which corresponds to 14 g of dry product.

Once the mixture has been brought to 75° C., with stirring, 0.8 g of ammonium persulphate dissolved in 10 ml of water is added and the preemulsion is then introduced in the course of 3 hours.

The mixture is kept at 75° C. for a further 1 hour after the end of the introduction and is then brought back to ambient temperature.

A latex with a dry extract content of 27% is obtained which is soluble in alkalis.

50 g of this latex are introduced into a beaker and 400 g of water are added; the dry extract is then 3% by weight.

The mixture is brought to 60° C., with stirring, and a 20% by weight solution of ammonia is then added to bring the pH to a value of 8.

The dispersion then changes to a solution (or pseudo solution) of modified polymer.

EXAMPLE 3

The operation described in Example 1 is repeated using the following reactants and reactant amounts:

Preemulsion 100 g of methyl methacrylate
56 g of ethyl acrylate
9 g of acrylic acid
35 g of a silicone oil of formula

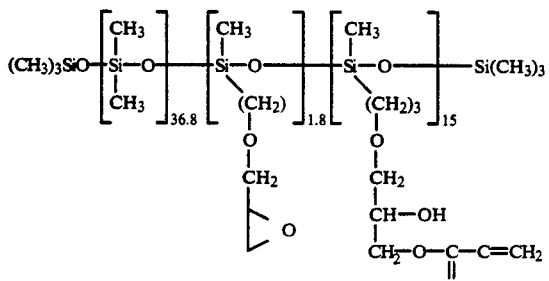

0.1 g of lauroyl peroxide.

Polymerization 350 g of water
100 g of a 25 aqueous solution of GEROL PS 30 (water-dispersible sulphonated polyester marketed by RHONE-POULENC), which corresponds to 25 g of dry product
0.6 g of ammonium persulphate.

A latex containing 30% of dry extract is obtained.

EXAMPLE 4

The operation described in Example 1 is repeated using the following reactants and reactant amounts:

Preemulsion 150 g of methyl methacrylate
30 g of ethyl acrylate
20 g of butyl acrylate
20 g of methacrylic acid
7 g of a silicone oil of formula

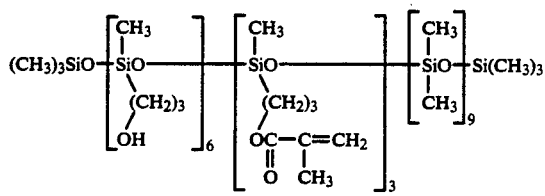

0.2 g of lauroyl peroxide.

Polymerization 300 g of water
50 g of a 25% aqueous solution of GEROL PHS (water-dispersible sulphonated polyester marketed by RHONE-POULENC), which corresponds to 12.5 g of dry product.

A latex containing 35% of dry extract is obtained.

EXAMPLE 5

The operation described in Example 2 is repeated using the following reactants and reactant amounts:

Preemulsion 130 g of vinyl acetate
45 g of butyl acrylate
5 g of acrylic acid
20 g of methacrylic acid
40 g of a silicone oil of formula

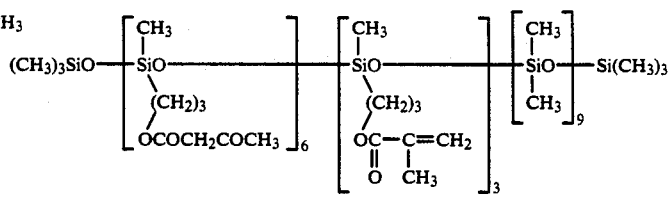

0.2 g of lauroyl peroxide.

Polymerization: unchanged.
A latex containing 27% of dry extract is obtained.

We claim:

1. Modified polymers based on a graft polyester comprising:
   (A) 2 to 60% by weight, relative to the modified polymer, of a backbone derived from a water-dispersible sulphonated polyester,
   (B) 0.05 to 30% by weight, relative to the modified polymer, of at least one ethylenically unsaturated organopolysiloxane soluble in the vinyl monomer(s) of (C), and
   (C) the balance of the 100% by weight, units derived from at least one vinyl monomer.

2. Polymers according to claim 1, wherein the respective amounts of backbone and grafts correspond to:
   10 to 50% by weight, relative to the modified polymer, of water-dispersible sulphonated polyester,
   0.5 to 10% by weight, relative to the modified polymer, of ethylenically unsaturated organopolysiloxane,
   and, the balance of the 100% by weight, units derived from at least one vinyl monomer.

3. Modified polyesters according to any one of the preceding claims, wherein the water-dispersible sulphonated polyester has a number-average molecular mass of between 10,000 and 35,000, an acid number of less than 5 mg of KOH/g and a proportion of sulphur of between 0.8 and 2% by weight.

4. Modified polymers according to claim 3, wherein the organopolysiloxane from which the grafts are derived is represented by the formula:

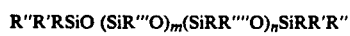

in which formula (a) the symbols R are identical or different and represent a $C_1$-C-alkyl radical, phenyl or 3,3,3-trifluoropropyl, (b) the symbols R' are identical or different and represent R or a vinyl radical, (c) the symbols R" are identical or different and represent R or a radical OH, p1 (d) the symbols R'" are identical or different and represent R, a vinyl radical or a —r—X unit in which r represents a divalent organic radical and X represents an ethylenically unsaturated group, (e) the symbols R"" are identical or different and represent R'" or a —r'X' unit in which r' represents a divalent organic radical and X' represents a group which is not ethylenically unsaturated, (f) at least 60% of the radicals represented by R, R' and R" are methyl radicals, and (g) the symbols m and n separately can be zero, with the proviso that when m is zero, R' and/or R"" represent a vinyl radical, and have a value sufficient to ensure a viscosity of the polymer of from about 20 mPas to about 10,000,000 mPas at 25° C.

5. Modified polymers according to claim 4, wherein the vinyl monomers from which the grafts are derived are monoethylenically unsaturated esters of carboxylic acids, saturated esters and amides of monoethylenically unsaturated carboxylic acids, monoethylenically unsaturated nitriles, or vinyl-aromatic monomers.

6. Process for the preparation of modified polymers, comprising the steps of:

(a) forming a preemulsion, in water, of a solution of an ethylenically unsaturated organopolysiloxane in one or more vinyl monomers, and (b) adding said preemulsion to an aqueous solution of a water-dispersible sulphonated polyester and polymerizing said polyester with said ethylenically unsaturated organopolysiloxane and said one or more vinyl monomers in the presence of a water-soluble or water-dispersible initiator to form a polymer having a backbone derived from said sulphonated polyester and grafts consisting of copolymer units derived from said vinyl monomers and said organopolysiloxane.

7. The process according to claim 6, wherein the amounts of reactants used correspond to:

2 to 60% by weight, relative to the total weight of vinyl monomers, organopolysiloxane and polyester used, of water-dispersible sulphonated polyester, 0.05 to 30% by weight, relative to the total weight of vinyl monomers, organopolysiloxane and polyester used, of ethylenically unsaturated organopolysiloxane, the balance of the 100% by weight with vinyl monomer or monomers, and 0.01 to 4% by weight, relative to the total weight of vinyl monomers, organopolysiloxane and polyester used, of water-soluble or water-dispersible initiator.

8. The process according to claim 7, wherein the amounts of reactants used correspond to:

10 to 50% by weight, relative to the total weight of vinyl monomers, organopolysiloxane and polyester used, of water-dispersible sulphonated polyester, 0.5 to 10% by weight, relative to the total weight of vinyl monomers, organopolysiloxane and polyester used, of ethylenically unsaturated organopolysiloxane, the balance of the 100% by weight with vinyl monomer or monomers, and 0.05 to 2% by weight, relative to the total weight of vinyl monomers, organopolysiloxane and polyester used, of water-soluble or water-dispersible initiator.

9. The process according to any one of claims 6 to 8, wherein the step of forming a preemulsion is carried out using an amount of reactants corresponding to a weight ratio of vinyl monomer or monomers+organopolysiloxane/water of from about 1/5 to about 5/1;

10. The process according to claim 9, wherein the step of forming a preemulsion is carried out in the presence of 0.1 to 3% by weight, relative to the total weight of vinyl monomer or monomers+polymers, of an initiator soluble in organic compounds.

11. The process according to claim 10, wherein the organopolysiloxane has the formula

in which formula (a) the symbols R are identical or different and represent a $C_1$-$C_4$-alkyl radical, phenyl or 3,3,3-trifluoropropyl, (b) the symbols R' are identical or different ad represent R or a vinyl radical, (c) the symbols R" are identical or different and represent R or a radical OH, (d) the symbols R'" are identical or different and represent R, a vinyl radical or a —r—X unit in which r represents a divalent organic radical and X represents an ethylenically unsaturated group, (e) the symbols "" are identical or different and represent R'" or a —r'—X' unit in which r' represents a divalent organic radical and X' represents a group which is not ethylenically unsaturated, (f) at least 60% of the radicals represented by R, R' and R" are methyl radicals, and (g) the symbols m and n separately can be zero, with the proviso that when m is zero, R' and/or R"" represent a vinyl radical, and have a value sufficient to ensure a viscosity of the polymer of from about 20 mPas to about 10,000,000 mPas at 25° C.

12. The process according to claim 11, wherein the vinyl monomers are monoethylenically unsaturated esters of carboxylic acids, saturated esters and amides of monoethylenically unsaturated carboxylic acids, monoethylenically unsaturated nitriles, or vinyl-aromatic monomers.

13. The process according to claim 11, wherein the water-dispersible sulphonated polyester has a number average molecular mass of between 10,000 and 35,000, an acid number of less than 5 mg of KOH/g and a proportion of sulphur of between 0.8 and 2% by weight.

14. A coating agent comprising at least one modified polymer based on the graft polyester according to claim 1.

* * * * *